Patented Mar. 2, 1948

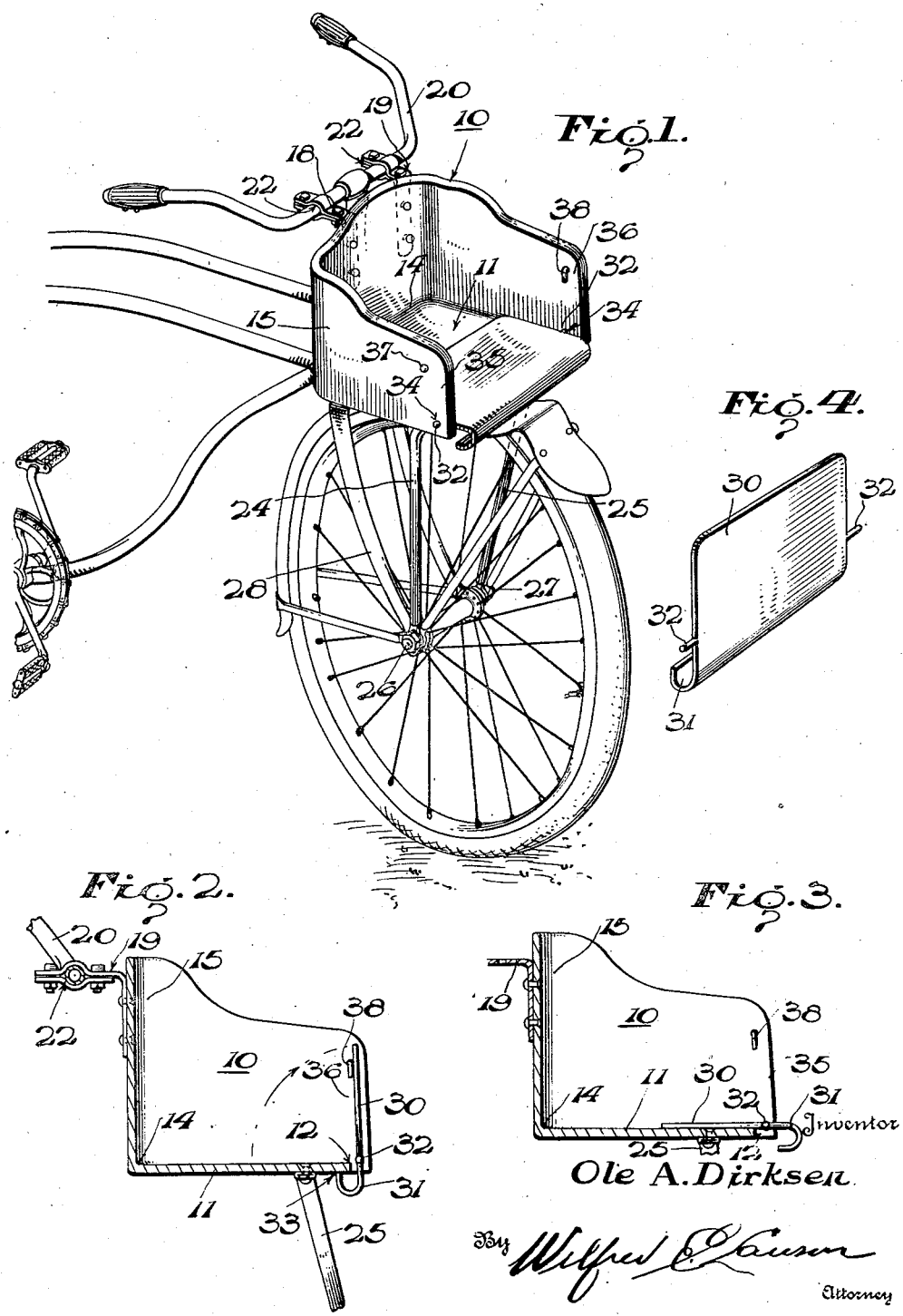

2,436,991

UNITED STATES PATENT OFFICE 2,436,991

COMBINATION BICYCLE SEAT AND LUGGAGE CARRIER

Ole A. Dirksen, Spencer, Iowa

Application August 19, 1946, Serial No. 691,565

6 Claims. (Cl. 224—31)

The present invention relates to a combination seat and parcel or luggage carrier for bicycles, motorcycles and the like.

It is an object of the invention to provide a novel convertible carrier attachment for bicycles or the like, whereby the carrier may be easily converted into a seat or into a parcel carrier.

Another object is to provide an attractive carrier attachment for bicycles or the like, combining simplicity, economy and durability to facilitate its production as an article of manufacture and to further provide a desirable and very useful product.

Another object is to provide a novel bicycle seat having a rolled front edge and occupant conforming back, to thereby provide for maximum comfort in a bicycle seat.

A further object is to provide a novel cycle seat having a hinged front wall adapted to be raised when the seat is unoccupied, to thereby convert the seat into a parcel carrier.

With these and other objects in view, the invention consists in the construction, arrangement and combination of parts hereinafter described and particularly pointed out in the claims, it being understood that I do not intend to limit myself to the details of construction.

In the drawing, like parts throughout the several views are given like numerals and are thus identified in the following detailed description.

Figure 1 is a general perspective view of my novel device attached to a bicycle and with the front wall down for use as a seat.

Figure 2 is a side cross section view of the device with the front wall raised for use as an article carrier.

Figure 3 is a side cross section like Fig. 2 with the front wall down for use as a seat.

Figure 4 is a perspective view of the novel front wall per se.

Referring in detail to the drawing, the device comprises a body 10, having a bottom plate 11, with a straight front edge 12, which edge continues rearwardly into a rounded rear edge 14. Secured to the peripheral edge of the bottom plate 11 from each end of the front edge 12 is an upstanding wall 15, which conforms to the rounded rear edge 14 of plate 11, and thus provides a seat back adapted to comfortably conform to the back of an individual sitting on the plate 11 when the device is used as a seat.

The plate 11 and wall 15 may be of any suitable material, plastic or light weight metal and secured together by rivets, not shown, or by welding, if metal is used.

When used as a seat for attachment to the front of a bicycle or the like the top rear edge of wall 15 has secured to it a pair of brackets 18 and 19 for attachment to handle bars 20. These brackets comprise a strip of rigid material bent at substantially right angles to the top edge of wall 15 and extend rearwardly from the wall into a clamp portion 22, adapted to clamp around the handle bars 20 to each side of the cycle frame in which the center portion of the bars are mounted.

Extending downwardly from each side of the body 10, and toward the front of the same, are secured the top ends of brace bars 24 and 25. The ends of each of these brace bars have openings therein, the lower end openings being attachable to the ends of the bolts 26 and 27 extending through each end of the front wheel fork 28. The upper top ends may be merged into one piece so that the brace bar gives the appearance of an inverted U.

A novel feature of this invention is to provide a bottom pivoted wall 30 over the straight front edge 12 of the bottom plate 11. This wall 30 has a dual function; first it serves to protect the legs of the occupant of the device when it is used as a seat, and second it serves as a retaining wall for parcels or the like when the device is used as an article carrier. The wall 30 comprises a flat plate with a curled edge surface 31. The wall 30 is provided with hinge pintles 32 on each lower side, which pintles are held in sockets 33 and 34 in extended end portions 35 and 36 of wall 15 above each end of the front edge 12. Each portion 35 and 36, respectively, are pushed inward at two opposite spots to provide inwardly extending rounded lugs 37 and 38, which as hereinafter explained coact with the curled edge 31 to latch the wall 30 in an erect vertical position from the bottom plate 11. When the wall 30 is swung down, it rests on the bottom plate 11 with the curled edge 31 downward and over the straight front edge 12, to thereby provide a rounded surface for contact with the legs of an occupant of the device when used as a seat.

The plate is so mounted and pivoted between the extended portions 35 and 36 of the wall 15, that when it is in an erect or vertical position with respect to the bottom plate 11 the curled edge 31 is positioned below the bottom plate 11 and the downwardly curled edge 31, which is of substantially U-shape and it contacts at the free end of the U with the under front edge surface 33 of the plate 11. This contact of the U-edge of the curl 31 serves as a stop to limit the forward pivoting of the wall 30 after the side edges of wall 30 have snapped by the lugs 37 and 38. Thus the lugs 37 and 38 coact with the curled edge 31 on the wall 30 to lock the same in an erect position, so as to close the front end of the body 10 and convert the seat into an article carrier.

While the several features of the present invention are more or less specifically described, I wish it understood that various changes may be resorted to within the scope of the appended claims.

What I claim is:

1. A convertible carrier attachment for cycles comprising a flat bottom plate designed to provide a seat, said bottom plate having a straight front edge, a wall around the bottom from the front edge and a front wall pivotally mounted adjacent the bottom edge thereof in side portions of said first-mentioned wall, which portions extend beyond the front edge of said bottom plate, whereby said front wall may be raised from a position of rest on the bottom plate to an erect substantially vertical plane with respect to said bottom plate and in front of said front edge of the said plate.

2. A convertible carrier attachment for cycles comprising a bottom plate, said bottom plate having a straight front edge, a wall around the bottom from the front edge and a front wall pivotally mounted adjacent the bottom edge thereof in side portions of said first-mentioned wall, which portions extend beyond the front edge of said bottom plate, whereby said front wall may be raised from a position of rest on the bottom plate to an erect substantially vertical plane with respect to said bottom plate and in front of said front edge of the said plate, said front wall having a curled edge adapted to project beyond the said straight front edge of the bottom when said wall is resting on the said bottom.

3. A convertible carrier attachment for cycles comprising a bottom plate, said bottom plate having a straight front edge, a wall around the bottom from the front edge and a front wall pivotally mounted adjacent the bottom edge thereof in side portions of said first-mentioned wall, which portions extend beyond the front edge of said bottom plate, whereby said front wall may be raised from a position of rest on the bottom plate to an erect substantially vertical plane with respect to said bottom plate and in front of said front edge of the said plate, said front wall having a curled edge adapted to project beyond the said straight front edge of the bottom when said wall is resting on the said bottom, said curled edge having its free end adapted to engage against the under surface edge of the bottom plate when said front wall is in erect position.

4. The device as described in claim 3, wherein the said extended side portions of the first-mentioned wall contain inwardly projecting lugs adapted to latch said front wall in an erect position in cooperation with the free bottom plate contacting end of the curled portion of said front wall.

5. A bicycle seat for attachment to the handle bars, comprising a rounded back, a substantially flat seat bottom, and a leg protective curled front edge over the front edge of said seat bottom.

6. A convertible article carrier comprising a bottom plate, a rounded back portion connected to the bottom plate, said plate having a straight front edge, continuing side portions extending beyond the said front edge at each end, a bottom hinged wall mounted between said side portions, said hinged wall having a curled U-shaped edge adapted to extend below the plane of said bottom plate and engage with the underside thereof when swung into an erect position between the said side portions, and means in said side portions adapted to coact with the said curled edge of the wall, to thereby retain the same in erect position.

OLE A. DIRKSEN.

REFERENCES CITED

The following references are of record in the file of this patent:

UNITED STATES PATENTS

| Number | Name | Date |
|---|---|---|
| 477,042 | Calver | June 14, 1892 |
| 2,327,537 | Lyman | Aug. 24, 1943 |

FOREIGN PATENTS

| Number | Country | Date |
|---|---|---|
| 511,341 | France | Sept. 23, 1920 |
| 533,244 | France | Dec. 7, 1921 |